United States Patent
Wang

(10) Patent No.: US 12,075,179 B2
(45) Date of Patent: Aug. 27, 2024

(54) IMAGE SIGNAL AND PHASE DETECTION AUTOFOCUS SIGNAL EXTRACTION AND STORAGE IN AN ARITHMETIC LOGIC UNIT

(71) Applicant: OMNIVISION TECHNOLOGIES, INC., Santa Clara, CA (US)

(72) Inventor: Rui Wang, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 121 days.

(21) Appl. No.: 18/047,588

(22) Filed: Oct. 18, 2022

(65) Prior Publication Data

US 2024/0129650 A1    Apr. 18, 2024

(51) Int. Cl.
*H04N 25/772* (2023.01)
*G06F 7/501* (2006.01)
*G06F 7/57* (2006.01)

(52) U.S. Cl.
CPC ........... *H04N 25/772* (2023.01); *G06F 7/501* (2013.01); *G06F 7/57* (2013.01)

(58) Field of Classification Search
CPC .......... H04N 25/772; G06F 7/501; G06F 7/57
See application file for complete search history.

(56) References Cited

U.S. PATENT DOCUMENTS

| | | | | |
|---|---|---|---|---|
| 3,919,504 A | * | 11/1975 | Crosley | G06F 11/22 324/415 |
| 6,490,807 B1 | * | 12/2002 | Tanaka | G01D 5/2457 33/708 |
| 6,937,172 B1 | * | 8/2005 | Lowe | H03K 23/005 341/97 |
| 11,431,936 B2 | | 8/2022 | Fan et al. | |
| 2008/0143576 A1 | * | 6/2008 | Chen | H03M 1/145 341/162 |
| 2013/0311814 A1 | * | 11/2013 | Turullols | G06F 1/14 713/400 |
| 2015/0138408 A1 | * | 5/2015 | Lee | H04N 25/75 348/294 |
| 2016/0308666 A1 | * | 10/2016 | Mekhiel | G06F 1/04 |
| 2020/0153440 A1 | * | 5/2020 | Sakurai | H03M 1/56 |
| 2021/0329185 A1 | * | 10/2021 | Fan | H03M 1/56 |
| 2022/0210359 A1 | * | 6/2022 | Shikina | H04N 25/75 |
| 2022/0269482 A1 | * | 8/2022 | Fan | G06F 7/507 |

OTHER PUBLICATIONS

U.S. Appl. No. 17/934,196, filed Sep. 21, 2022.

* cited by examiner

*Primary Examiner* — Chiawei Chen
(74) *Attorney, Agent, or Firm* — PERKINS COIE LLP

(57) ABSTRACT

An arithmetic logic unit (ALU) includes a front end latch stage coupled to a signal latch stage coupled to a Gray code (GC) to binary stage. First inputs of an adder stage are coupled to receive outputs of the GC to binary stage. An adder input latch stage includes first and second adder input latches including first and second inputs coupled to receive outputs of the GC to binary stage. An adder input multiplexer stage includes an output coupled to second inputs of the adder stage, and first and second inputs coupled to outputs the first and second adder input latches, respectively.

51 Claims, 5 Drawing Sheets

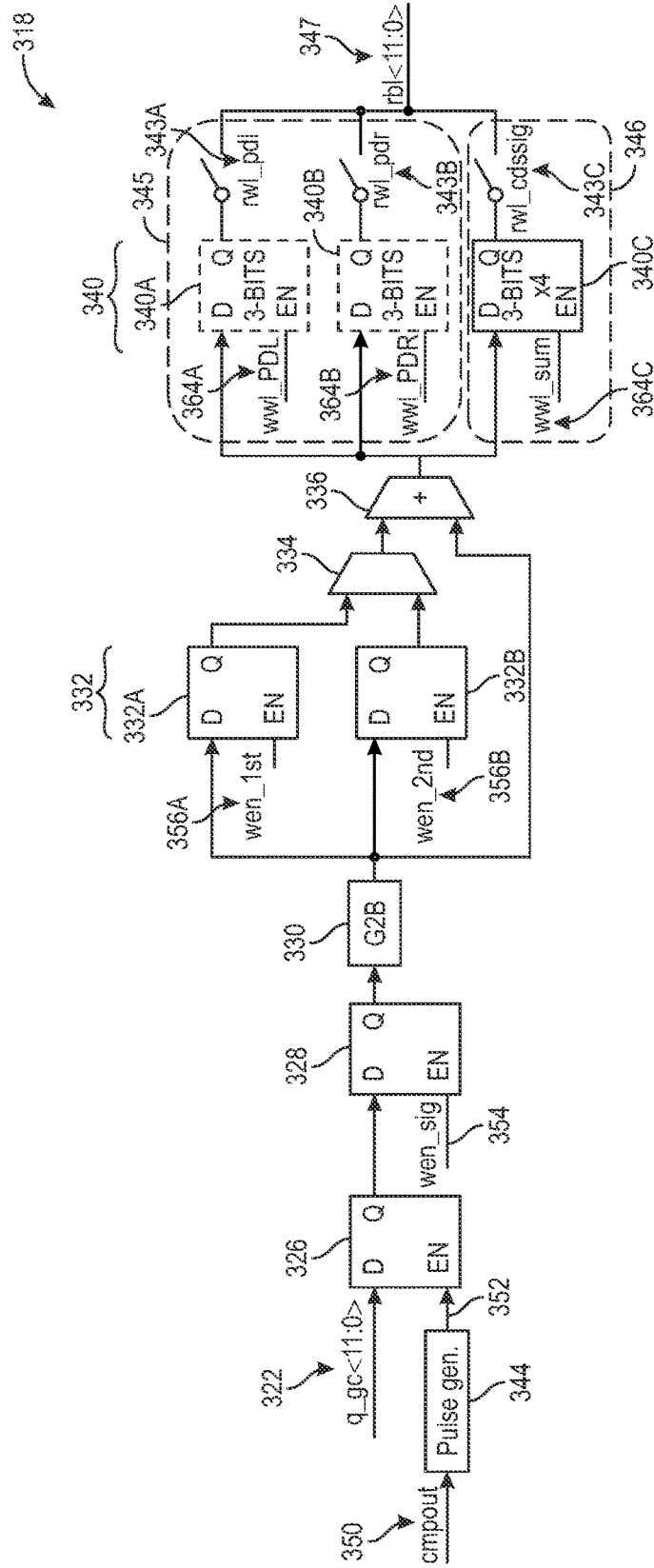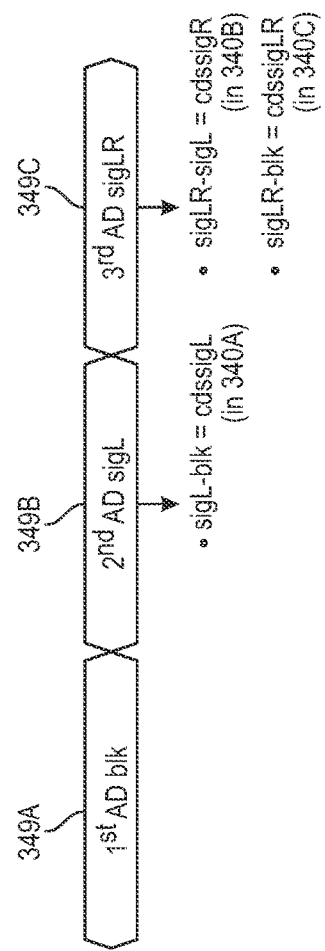
FIG. 3A
FIG. 3B

IMAGE SIGNAL AND PHASE DETECTION AUTOFOCUS SIGNAL EXTRACTION AND STORAGE IN AN ARITHMETIC LOGIC UNIT

BACKGROUND INFORMATION

Field of the Disclosure

This disclosure relates generally to image sensors, and in particular but not exclusively, relates to an arithmetic logic unit for use in image sensors.

Background

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 3A is a schematic that illustrates one example of a portion of one of a plurality of arithmetic logic units in accordance with the teachings of the present disclosure.

FIG. 3B illustrates one example of timing of analog-to-digital conversions and storage of various extracted signals in an example arithmetic logic unit in accordance with the teachings of the present disclosure.

Figure 1:
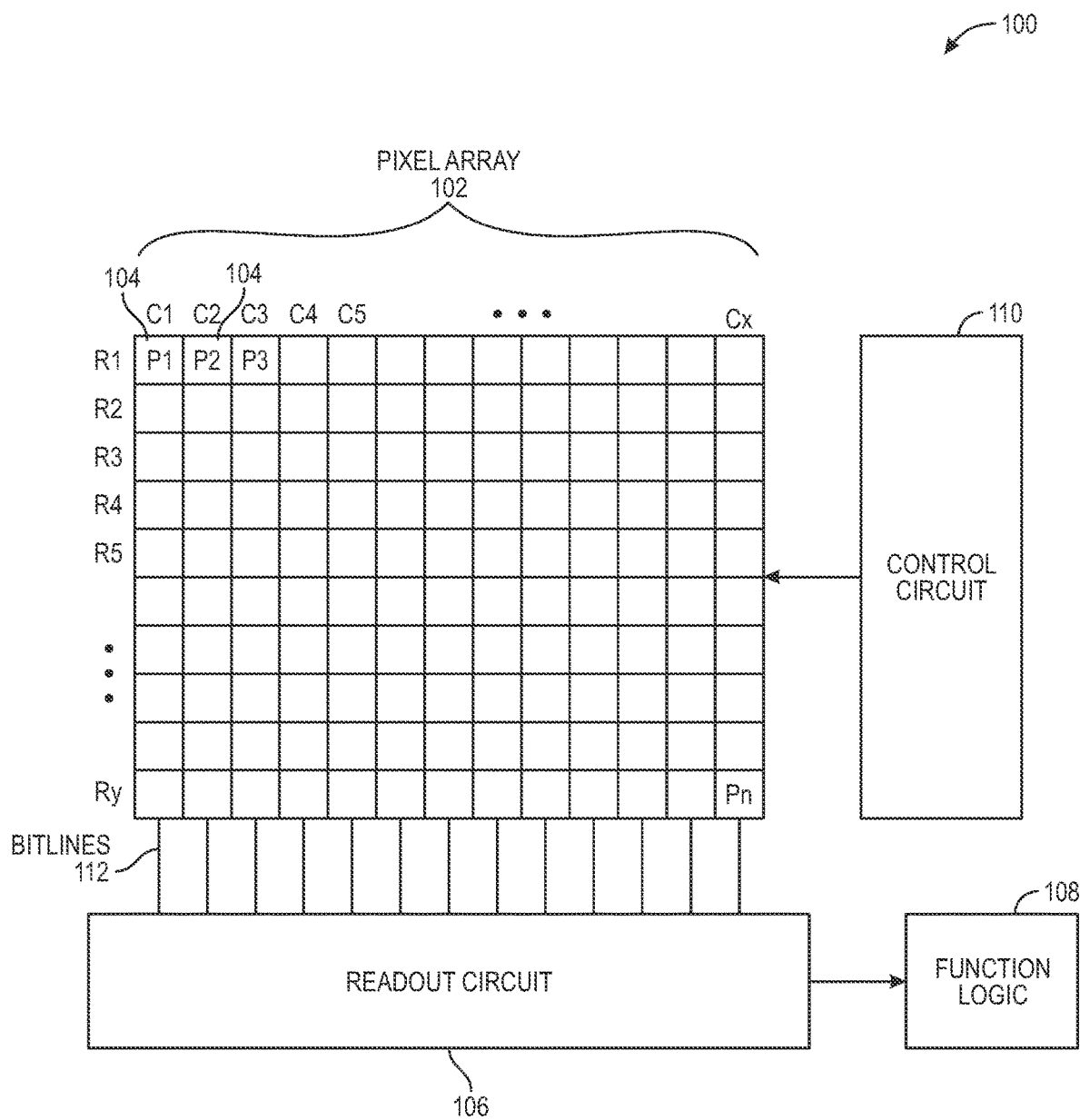
FIG. 1 illustrates one example of an imaging system including a pixel array with image sensing and phase detection autofocus pixels as well as a readout circuit including column arithmetic logic units utilized to extract and store the various signals in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Various examples directed to image signal and phase detection autofocus signal extraction and storage in arithmetic logic units (ALUs) included in an analog-to-digital converter of an imaging system are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (e.g., rotated ninety degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an image sensor readout circuit are disclosed in which analog image signals as well as phase detection autofocus signals from a pixel array with are extracted and stored in column arithmetic logic units (ALUs) through the column bit lines of an image sensor. In various examples, it is appreciated that digital power consumption is reduced with column ALUs in accordance with teachings of the present disclosure by extracting and then storing the phase detection autofocus signals locally in latches included inside the column ALUs instead of in image signal processors (ISPs) that are external to the column ALUs.

In addition, in the various examples, the image sensing and phase detection autofocus signals may be read out from the image sensor with correlated double sampling (CDS) outputs as well as with dual conversion gain (e.g., high conversion gain and low conversion gain). In the various examples, each column bit line of the pixel array is coupled to one of the inputs of a respective comparator. The other input of each comparator is coupled to receive a global ramp signal. The output of each comparator is coupled to a respective column ALU that is configured to extract, store, and output digital or binary representations of the image signals and phase detection autofocus signals from the pixel array. In various examples, normalized outputs (e.g., CDS outputs) generated by the column ALUs may be based on a difference between one or more image signals or phase detection autofocus samples (e.g., signals and black signals or reset value signals) from the pixel array. In the various examples, a shared Gray code (GC) generator is used to generate GC outputs that are coupled to be received by each of the column ALUs to perform parallel analog-to-digital conversion (ADC) of the signals that are read out from the column bit lines in accordance with teachings of the present disclosure.

To illustrate, FIG. 1 shows one example of an imaging system 100 including a pixel array 102 with image sensing and phase detection autofocus (PDAF) pixels as well as a readout circuit 106 including column arithmetic logic unit (ALUs) utilized to extract and store the various signals in accordance with the teachings of the present disclosure. In one example, the analog image signals and phase detection autofocus (PDAF) signals are read out in parallel through column bit lines 112 to the readout circuit 106 in accordance with an embodiment of the present disclosure. As will be discussed in greater detail below, in various examples, readout circuit 106 includes circuitry to perform analog-to-digital conversion (ADC) of the image and PDAF data from pixel array 102 with parallel column ALUs and a shared Gray code (GC) generator for correlated double sampling (CDS) and/or dual conversion gain (DCG) processing in accordance with the teachings of the present disclosure.

In particular, the example depicted in FIG. 1 shows an imaging system 100 that includes pixel array 102, control circuit 110, readout circuit 106, and function logic 108. In one example, pixel array 102 is a two-dimensional (2D) array including a plurality of pixel circuits 104, which include photodiodes (e.g., P1, P2, . . . , Pn). In various examples, the photodiodes P1, P2, . . . , Pn include photodiodes that are configured to provide image data as well as photodiodes that are configured to provide PDAF data. In various examples, the photodiodes that are configured to provide PDAF data may be interspersed among the photodiodes that are configured to provide image data. As illustrated in the depicted example, the pixel circuits 104 are arranged into rows (e.g., R1 to Ry) and columns (e.g., C1 to Cx) to acquire image data and/or PDAF data of a person, place, object, etc., which can then be used to render an image of a person, place, object, etc.

In the example, each pixel circuit 104 is configured to photogenerate image and/or PDAF charge in response to incident light. After each pixel circuit 104 has acquired its image and/or PDAF charge, the corresponding analog image and/or PDAF charge data is read out by readout circuit 106 through column bit lines 112. In the various examples, the image and/or PDAF charge data from each row of pixel circuits 104 is read out in parallel through column bit lines 112 by readout circuit 106. In the various examples, the analog image charge signals and/or PDAF charge signals are converted to digital values, which are then transferred to function logic 108 in accordance with teachings of the present disclosure.

In various examples, the analog-to-digital conversion is performed with parallel ALUs and shared Gray code generator included in readout circuit 106. In various examples, the parallel ALUs readout included in readout circuit 106 may be configured to extract the image signals as well as the PDAF signals and perform correlated double sampling (CDS) processing by finding the difference between one or more signal level samples and one or more black level samples from each of a plurality of pixel circuits 104 of the pixel array 102. In the various embodiments, the extracted image signals as well as the extracted PDAF signals may be stored locally in the column ALUs in the readout circuit 106, and then output to image signal processing. In the various examples, the function logic 108 may store the image data and phase detection autofocus data or even manipulate the image data by applying post image effects (e.g., crop, rotate, remove red eye, adjust brightness, adjust contrast, or otherwise).

Figure 2:
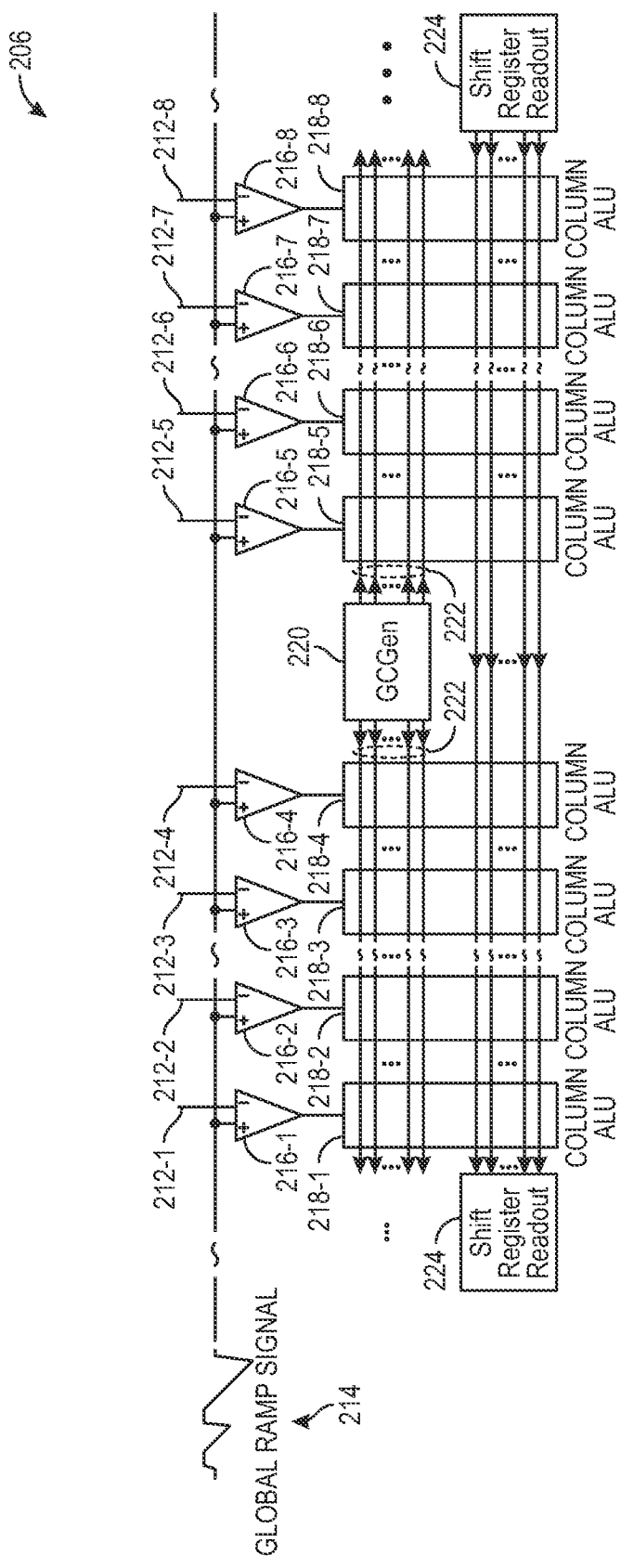
FIG. 2 illustrates a one example of a portion of a readout circuit including column analog-to-digital conversion with a Gray code generator and parallel column arithmetic logic units utilized to extract and store the various signals in accordance with the teachings of the present disclosure.

FIG. 2 illustrates a one example of a portion of a readout circuit including column analog-to-digital conversion with a Gray code generator and parallel column ALUs utilized to extract and store the various signals in accordance with the teachings of the present disclosure. It is appreciated the readout circuit 206 of FIG. 2 may be one example of the readout circuit 106 of the image sensor 100 as shown in FIG. 1, and that similarly named and numbered elements described above are coupled and function similarly below.

As shown in the example depicted in FIG. 2, the portion of readout circuit 206 includes a plurality of comparators 216. Each one of the plurality of comparators 216 is coupled to receive a ramp signal 214, which in one example is a global ramp signal. Each one of the plurality of comparators 216 is further coupled to a respective one of a plurality of column bit lines 212 from an image sensor to receive a respective analog image or PDAF data signal from a column of the image sensor. As shown in the example, the outputs of the plurality of comparators 216 are coupled in parallel to respective column ALUs 218. Each one of the plurality of ALUs 218 is also coupled to receive Gray code (GC) outputs 222 that are generated by a shared Gray code (GC) generator 220 as shown. In one example, the GC outputs 222 that are generated by the GC generator 220 are phase-aligned 13-bit Gray code signals.

In operation, each one of the plurality of comparators 216 is coupled to generate a respective comparator output in response to a comparison of the respective analog image or PDAF data signal received from the respective bit line 212 and the ramp signal 214. In one example, when the voltage of the ramp signal 214 ramps down to a value equal to or less than the voltage of the analog image or PDAF data signal carried by the respective column bit line 212, a falling edge occurs at the output of the respective comparator 216. In the example, each respective column ALU 218 is coupled to sample and hold, or latch, the 13-bit Gray code signal 222 received from the GC generator 220 when the falling edge occurs at the output of the respective comparator 216 that is coupled to the respective column ALU 218. In the various examples, each column ALU 218 is then configured to perform Gray code to binary code conversion on the latched GC code signal 222.

In various examples, the column ALUs 218 are configured to extract the image signals as well as the PDAF signals and store the signals locally in the column ALUs. By extracting and storing the PDAF signal locally inside the column ALUs 218 instead of in image signal processors external to the column ALUs 218, it is appreciated that digital power consumption is reduced in accordance with the teachings of the present disclosure. In various examples, the column ALUs 218 may also be coupled perform correlated double sampling (CDS) or operations in parallel by determining a difference between one or more sampled and held reset (SHR) values (which may also be referred to as black level samples in this disclosure) and one or more sampled and held signal (SHS) samplings (which may also be referred to as signal level samples in this disclosure) from the respective column bit lines 212 to generate normalized digital image signal or PDAF data from the image sensor in accordance with the teachings of the present disclosure. In one example, the digital image or PDAF signal data extracted and stored within the column ALUs 218 may then be output to respective global read bit lines of the readout circuit 206.

In one example, the portion of readout circuit 206 shown in FIG. 2 may be one of a plurality of portions of readout circuit 206 that are repeated or "stitched together" across the columns of an image sensor array. In the example shown in FIG. 2, the image signal outputs from the column ALUs 218 may therefore be relayed from "right" to "left" through the column ALUs 218 of each portion of readout circuit 206, and with shift register readouts 224 coupled to the first and last columns and interspersed between every N columns of the image sensor array, to readout out the image or PDAF data from the image sensor array. For instance, in an example of a 48 megapixel sensor array, there are 8,000 columns. In the example, a single GC generator 220 may be shared among each N=500 columns of the sensor array, such that a total of 16× portions of readout circuit 206 shown in FIG. 2 are included between shift register readouts 224 coupled to the first and last columns and interspersed every 500 columns to readout the image signal outputs from the sensor array. In other words, shift readout registers 224 are coupled to respective ALUs 218 that are coupled to the first and last columns of the image sensor. In addition, shift registers 224 are coupled to and are interspersed between the plurality of ALUs 218 of each one of the plurality of readout circuits 206 to readout the respective digital image data signals from the plurality of ALUs 218.

FIG. 3A is a schematic that illustrates one example of a portion an ALU 318 in accordance with the teachings of the present disclosure. It is appreciated the portion of ALU 318 depicted in FIG. 3A may be one example of one of the plurality of column ALUs 218 as shown in FIG. 2, and that similarly named and numbered elements described above are coupled and function similarly below. It is also appreciated that the portion of ALU 318 depicted in FIG. 3A illustrates circuitry that processes one of the bits of an ALU 318. For instance, in the various examples, it is noted that each one of the plurality of ALUs 318 is coupled to sample and hold or latch a corresponding bit of a received 12-bit Gray code q_gc<11:0> 322 in response to the arrival of a falling edge of comparator output cmpout 350 to complete the analog-to-digital conversion by converting the latched 12-bit Gray code q_gc<11:0> 322 to a binary value.

To illustrate, the example ALU 318 shown in FIG. 3A includes a front end latch stage 326 coupled to receive and latch a respective bit of Gray code q_gc<11:0> 322 signal in response to comparator output cmpout 350. In the illustrated example, each latch of front end latch stage 326 has a data input "D" coupled to receive the respective bit of Gray code q_gc<11:0>.

In the example, ALU 318 also includes a pulse generator 344 that is coupled to receive the comparator output cmpout 350 from the respective comparator (e.g., comparator 216) of the column. In one example, the pulse generator 344 is coupled to generate a front end latch enable signal 352 in response to the arrival of a falling edge in the comparator output cmpout 350. In one example, the pulse of front end latch enable signal 352 is coupled to an enable input of each latch of front end latch stage 326.

In the depicted example, ALU 318 also includes a signal latch stage 328 coupled to the output of the front end latch stage 326. In operation, the signal latch stage 328 is coupled to latch outputs of the front end latch stage 326 in response to a signal latch enable signal wen_sig 354. As shown in the depicted example, each latch of the signal latch stage 328 includes a data input "D" coupled to the "Q" output of a respective one of latches of the front end latch stage 326.

The example in FIG. 3A shows that ALU 318 also includes a GC to binary stage (e.g., G2B) 330 that is coupled to generate binary representations of the Gray code q_gc<0> 322 signal values latched in the front end latch stage 326. In one example, GC to binary stage 330 includes a plurality of exclusive-OR gates (not shown), each of which has an output coupled to generate the corresponding binary bit, and a first input coupled to receive a respective "Q" output of the respective latch of signal latch stage 328.

As shown in the depicted example depicted in FIG. 3A, the ALU 318 also includes an adder stage 336, which includes a plurality of full adders, each of which having a first input coupled to an output of the GC to binary stage 330, and a second input coupled to an output of an adder input multiplexer stage 334, which will be described in greater detail below. In operation, the outputs of the adder stage 336 are generated in response to the first inputs from the GC to binary stage 330 and the second inputs from the adder input multiplexer stage 334. In one example, the outputs of adder stage 336 are configured to determine the difference between the values received at the first inputs and the values received at second inputs of the adder stage 336.

Continuing with the example depicted in FIG. 3A, the ALU 318 further includes an adder input latch stage 332 coupled to latch outputs of the GC to binary stage 330. In one example, the adder input latch stage 332 includes first adder input latches 332A, which are configured to latch the outputs of the GC to binary stage 330 in response to a first adder input latch enable signal wen_1st 356A. In the example, the adder input stage 332 includes second adder input latches 332B, which are configured to latch the outputs of the GC to binary stage 330 in response to a second adder input latch enable signal wen_2nd 356B. In the depicted example, first inputs of the adder input multiplexer stage 334 are coupled to receive outputs of the first adder input latches 332A, and second inputs of the adder input multiplexer stage 334 are coupled to receive outputs of the second adder input latches 332B. In operation, the second inputs of the adder stage 336 are coupled to receive outputs of either the first adder input latches 332A or second adder input latches 332B through the outputs of the adder input multiplexer stage 334.

The example in FIG. 3A shows that ALU 318 also includes a data latch stage 340 coupled to latch outputs of the adder stage 336. As shown in the depicted example, the data latch stage 340 includes first data latches 340A, second data latches 340B, and third data latches 340C. As will be discussed in the depicted example, the first data latches 340A are configured to latch first phase detection signals (e.g., cdssigL) from the outputs of the adder stage 336 in response to a first data latch enable signal wwl_PDL 364A, the second data latches 340B are configured to latch second phase detection signals (e.g., cdssigR) from the outputs of the adder stage 336 in response to a second data latch enable signal wwl_PDR 364B, and the third data latches 340C are configured to latch first summed data signals (e.g., cdssigLR) from the outputs of the adder stage 336 in response to a third data latch enable signal wwl_sum 364C.

In the various examples, it is appreciated that the data latch stage 340 includes a PDAF data storage latches 345, which are coupled to latch PDAF data, and image storage latches 346, which are coupled to latch image signal data. In the example, the PDAF data storage latches 345 include first data latches 340A and second data latches 340B, and image storage latches 346 include third data latches 340C.

As discussed previously, in various examples it is appreciated that the pixel array (e.g., pixel array 102) includes pixels (e.g., pixels 104) that include PDAF pixels that are interspersed among image sensing pixels. As such, there are more image sensing pixels that PDAF pixels. Accordingly, there are more third data latches 340C in image storage latches 346 than there are first data latches 340A and second data latches 340B in PDAF data storage latches 345. In one example, the data latch stage 340 includes three first data latches 340A and three second data latches 340B for every twelve third data latches 340C.

To illustrate, the example depicted in FIG. 3A shows that there are "3-bits" of first data latches 340A, "3-bits" of second data latches 340B, and "3-bits×4" third data latches 340C in data latches stage 340. In the example, the data itself is 12-bit and grouped into 4×3-bit, which depicts the distribution of storage. In a 4-column column example with a 4×8 region of pixels of a pixel array (e.g., pixel array 102), for 4 analog-to-digital converters on top, the storage provided by data latches 340 includes the 4×3-bits provided by third data latches 340C for image signal data, plus 3-bits provided by first data latches 340A for PDAF "left" data, plus 3 bits provided by second data latches 340B for PDAF "right" data. In other words, it is appreciated that the PDAF data storage latches 345 may be shared among multiple columns of the pixel array (e.g., pixel array 102).

FIG. 3B illustrates one example of timing of analog-to-digital conversion (ADC) operations and storage of various extracted signals in example arithmetic logic unit 318 of FIG. 3A in accordance with the teachings of the present disclosure. In particular, FIG. 3B shows a sequence of three ADC operations including a first ADC operation 349A, a second ADC operation 349B, and a third ADC operation 349C. In the example, the second ADC operation 349B occurs after the first ADC operation 349A, and the third ADC operation 349C occurs after the second ADC operation 349B.

In the example, an ADC operation of a black signal (e.g., blk) occurs during first ADC operation 349A. As such, after the first ADC operation 349A is complete and before the second ADC operation 349B begins, the Gray code representation q_gc<11:0> 322 of the black signal (e.g., blk) is latched in signal latch stage 328 and the binary representation of the black signal (e.g., blk) is latched in first adder input latch 332A of adder input latch stage 332 in response to first adder input latch enable signal wen_1st 356A.

During the second ADC operation 349B, an ADC operation of a left signal (e.g., sigL) occurs. As such, after the second ADC operation 349B is complete and before the third ADC operation 349C begins, the Gray code representation q_gc<11:0> 322 of the left signal (e.g., sigL) is latched in signal latch stage 328 and the binary representation of the left signal (e.g., sigL) is latched in second adder input latch 332B of adder input latch stage 332 in response to second adder input latch enable signal wen_2nd 356B. In addition, the binary representation of the left signal (e.g., sigL) is also received by the first inputs of the adder stage 336. In the example, the adder input multiplexer stage 334 is configured such that the black signal (e.g., blk) that is latched in the first adder input latch 332A is coupled to be received by the second inputs of the adder stage 336 through the first inputs of the adder input multiplexer stage 334. As such, with the left signal (e.g., sigL) at the first inputs of adder stage 336 and with the black signal (e.g., blk) at the second inputs of adder stage 336, a correlated double sampling (CDS) left signal (e.g., cdssigL) is coupled to be latched in the first data latches 340A of the data latch stage 340 through the outputs of the adder stage 336 in response to first data latch enable signal wwl_PDL 364A. In the example, the CDS left signal (e.g., cdssigL) is equal to the difference between the first and second inputs (e.g., sigL-blk) of the adder stage 336.

During the third ADC operation 349C, an ADC operation of a left-right signal (e.g., sigLR) occurs. As such, during ADC operation 349C, a left-right signal is coupled to be latched in the signal latch stage 328 and received by the first inputs of the adder stage 336. In particular, the Gray code representation q_gc<11:0> 322 of the left-right signal (e.g., sigLR) is latched in signal latch stage 328 and the binary representation of the left-right signal (e.g., sigLR) is coupled received by the first inputs of the adder stage 336. In the example, the adder input multiplexer stage 334 is configured such that the left signal (e.g., sigL) that is latched in the second adder input latch 332B is coupled to be received by the second inputs of the adder stage 336 through the second inputs of the adder input multiplexer stage 334. As such, with the left-right signal (e.g., sigLR) at the first inputs of adder stage 336 and with the left signal (e.g., sigL) at the second inputs of adder stage 336, a CDS right signal (e.g., cdssigR) is coupled to be latched in the second data latches 340B of the data latch stage 340 through the outputs of the adder stage 336 in response to second data latch enable signal wwl_PDR 364B. In the example, the CDS right signal (e.g., cdssigR) is equal to the difference between the first and second inputs (e.g., sigLR-sigL) of the adder stage 336.

Continuing with the third ADC operation 349C, after the CDS right signal (e.g., cdssigR) is latched in in the second data latches 340B, the adder input multiplexer stage 334 is configured such that the black signal (e.g., blk) that is latched in the first adder input latch 332A is coupled to be received by the second inputs of the adder stage 336 through the first inputs of the adder input multiplexer stage 334. As such, with the left-right signal (e.g., sigLR) at the first inputs of adder stage 336 and with the black signal (e.g., blk) at the second inputs of adder stage 336, a CDS left-right signal (e.g., cdssigLR) is coupled to be latched in the third data latches 340C of the data latch stage 340 through the outputs of the adder stage 336 in response to third data latch enable signal wwl_sum 364C. In the example, the CDS left-right signal (e.g., cdssigLR) is equal to the difference between the first and second inputs (e.g., sigLR-blk) of the adder stage 336.

In the various examples, it is appreciated that the CDS left signal (e.g., cdssigL) latched in first data latches 340A, the CDS right signal (e.g., cdssigR) latched in second data latches 340B, and the CDS left-right signal (e.g., cdssigLR) latched in third data latches 340C may be output from ALU 318 as output bits rbl<11:0> 347 through output switches rwl_pdl 343A, rwl_pdr 343B, and rwl_cdssig 343C, respectively, as shown.

Figures 4A, 4B:
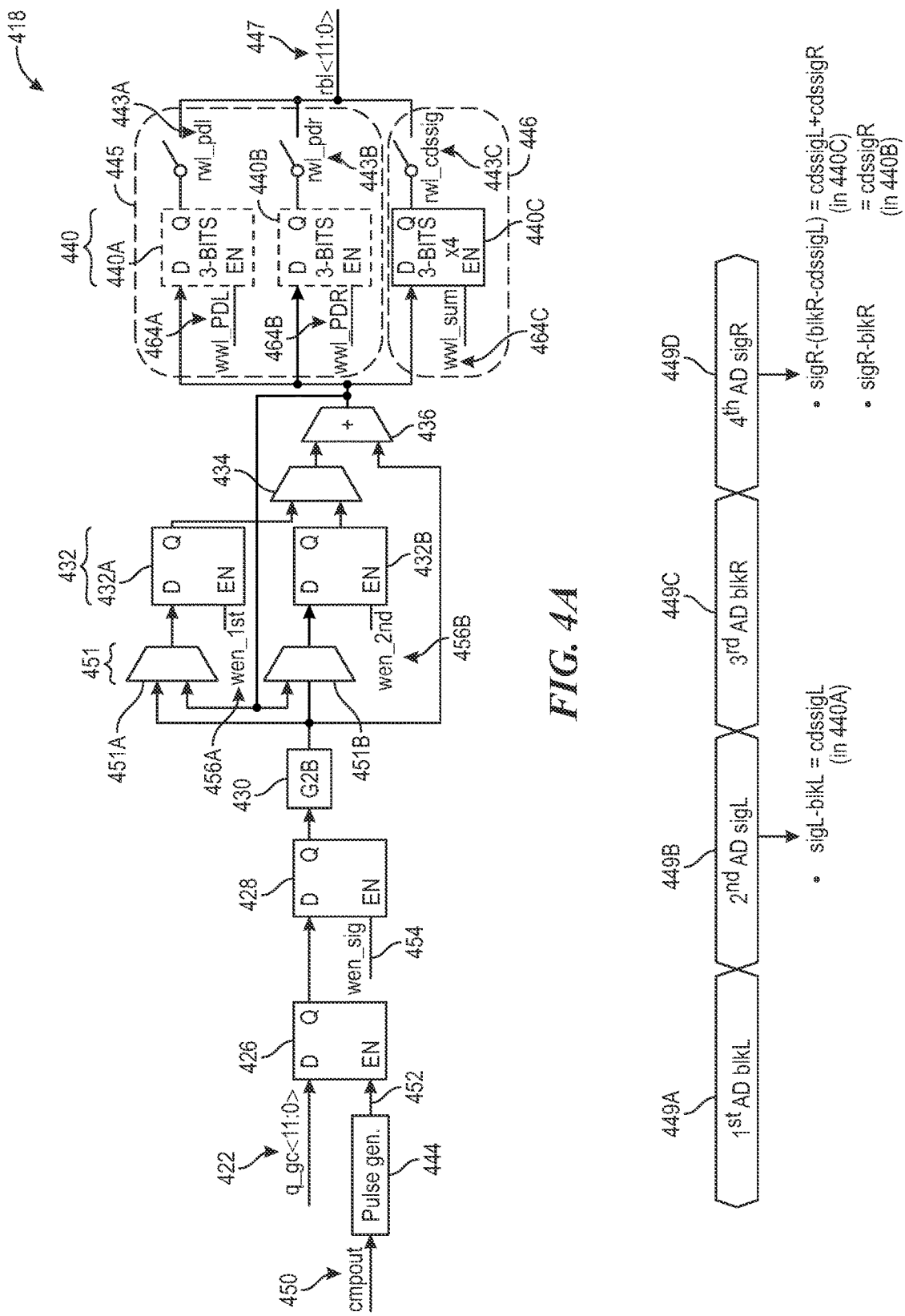
FIG. 4A is a schematic that illustrates another example of a portion of one of a plurality of arithmetic logic units in accordance with the teachings of the present disclosure.
FIG. 4B illustrates another example of timing of analog-to-digital conversions and storage of various extracted signals in another example arithmetic logic unit in accordance with the teachings of the present disclosure.

FIG. 4A is a schematic that illustrates another example of a portion of one of a plurality of ALUs 418 in accordance with the teachings of the present disclosure. It is appreciated the portion of ALU 418 depicted in FIG. 4A may be another example of one of the plurality of column ALUs 218 as shown in FIG. 2, and that similarly named and numbered elements described above are coupled and function similarly below. It is also appreciated that the portion of ALU 418 depicted in FIG. 4A shares many similarities with ALU 318 depicted in FIG. 3A. For instance, in the various examples, it is noted that each one of the plurality of ALUs 418 is coupled to sample and hold or latch a corresponding bit of a received 12-bit Gray code q_gc<11:0> 422 in response to the arrival of a falling edge of comparator output cmpout 450 to complete the analog-to-digital conversion by converting the latched 12-bit Gray code q_gc<11:0> 422 to a binary value.

As shown in the depicted example, ALU 418 includes a front end latch stage 426 coupled to receive and latch a respective bit of Gray code q_gc<11:0> 422 signal in response to comparator output cmpout 450. In the illustrated example, each latch of front end latch stage 426 has a data input "D" coupled to receive the respective bit of Gray code q_gc<11:0>.

In the example, ALU 418 also includes a pulse generator 444 that is coupled to receive the comparator output cmpout 450 from the respective comparator (e.g., comparator 216) of the column. In one example, the pulse generator 444 is coupled to generate a front end latch enable signal 452 in response to the arrival of a falling edge in the comparator output cmpout 450. In one example, the pulse of front end latch enable signal 452 is coupled to an enable input of each latch of front end latch stage 426.

In the depicted example, ALU 418 also includes a signal latch stage 428 coupled to the output of the front end latch stage 426. In operation, the signal latch stage 428 is coupled to latch outputs of the front end latch stage 426 in response to a signal latch enable signal wen_sig 454. As shown in the depicted example, each latch of the signal latch stage 428 includes a data input "D" coupled to the "Q" output of a respective one of latches of the front end latch stage 426.

The example in FIG. 4A shows that ALU 418 also includes a GC to binary stage (e.g., G2B) 430 that is coupled to generate binary representations of the Gray code q_gc<0> 422 signal values latched in the front end latch stage 426. In one example, GC to binary stage 430 includes a plurality of exclusive-OR gates (not shown), each of which has an output coupled to generate the corresponding binary bit, and a first input coupled to receive a respective "Q" output of the respective latch of signal latch stage 428.

As shown in the depicted example depicted in FIG. 4A, the ALU 418 also includes an adder stage 436, which includes a plurality of full adders, each of which having a first input coupled to an output of the GC to binary stage 430, and a second input coupled to an output of an adder input multiplexer stage 434, which will be described in greater detail below. In operation, the outputs of the adder stage 436 are generated in response to the first inputs from the GC to binary stage 430 and the second inputs from the adder input multiplexer stage 434. In one example, the outputs of adder stage 436 are configured to determine the difference between the values received at the first inputs and the values received at second inputs of the adder stage 436.

One of the differences between ALU 418 of FIG. 4A and ALU 318 of FIG. 3A is that ALU 418 of FIG. 4A also includes a feedback multiplexer stage 451. As shown in the example depicted in FIG. 4A, the feedback multiplexer stage 451 includes first feedback multiplexers 451A having first inputs coupled the outputs of the GC to binary stage 430 and second inputs coupled to the outputs of the adder stage 436. As shown, the feedback multiplexer stage 451 also includes second feedback multiplexers 451B having first inputs coupled the outputs of the GC to binary stage 430 and second inputs coupled to the outputs of the adder stage 436.

Continuing with the example depicted in FIG. 4A, the ALU 418 further includes an adder input latch stage 432 coupled to latch outputs of the GC to binary stage 430 or outputs of the adder stage 436 through the feedback multiplexer stage 451. In one example, the adder input latch stage 432 includes first adder input latches 422A, which are configured to latch the outputs of the GC to binary stage 430 or the adder stage 436 in response to a first adder input latch enable signal wen_1st 456A. In the example, the adder input stage 432 also includes second adder input latches 432B, which are configured to latch the outputs of the GC to binary stage 430 or the adder stage 436 in response to a second adder input latch enable signal wen_2nd 456B. In the depicted example, first inputs of the adder input multiplexer stage 434 are coupled to receive outputs of the first adder input latches 432A, and second inputs of the adder input multiplexer stage 434 are coupled to receive outputs of the second adder input latches 432B. In operation, the second inputs of the adder stage 436 are coupled to receive outputs of either the first adder input latches 432A or second adder input latches 43B through the outputs of the adder input multiplexer stage 434.

The example in FIG. 4A shows that ALU 418 also includes a data latch stage 440 coupled to latch outputs of the adder stage 436. It is appreciated that data latch stage 440 of FIG. 4A shares many similarities with data latch stage 340 of FIG. 3A. For instance, as shown in the example depicted in FIG. 4A, the data latch stage 440 includes first data latches 440A, second data latches 440B, and third data latches 440C. In the example, the first data latches 440A are configured to latch first phase detection signals (e.g., cdssigL) from the outputs of the adder stage 436 in response to a first data latch enable signal wwl_PDL 464A, the second data latches 440B are configured to latch second phase detection signals (e.g., cdssigR) from the outputs of the adder stage 436 in response to a second data latch enable signal wwl_PDR 464B, and the third data latches 440C are configured to latch first summed data signals (e.g., cdssigL+ cdssigR) from the outputs of the adder stage 436 in response to a third data latch enable signal wwl_sum 464C.

In the various examples, it is appreciated that the data latch stage 440 includes a PDAF data storage latches 445, which are coupled to latch PDAF data, and image storage latches 446, which are coupled to latch image signal data. In the example, the PDAF data storage latches 445 include first data latches 440A and second data latches 440B, and image storage latches 446 include third data latches 440C.

In the depicted example, it is appreciated that there are more third data latches 440C in image storage latches 446 than there are first data latches 440A and second data latches 440B in PDAF data storage latches 445. In one example, the data latch stage 440 includes three first data latches 440A and three second data latches 440B for every twelve third data latches 440C.

Similar to the example depicted in FIG. 3A, the example depicted in FIG. 4A shows that there are "3-bits" of first data latches 440A, "3-bits" of second data latches 440B, and "3-bits×4" third data latches 440C in data latches stage 440. In the example, the data itself is 12-bit and grouped into 4×3-bit, which depicts the distribution of storage. In a 4-column column example with a 4×8 region of pixels of a pixel array (e.g., pixel array 102), for 4 analog-to-digital converters on top, the storage provided by data latches 440 includes the 4×3-bits provided by third data latches 440C for image signal data, plus 3-bits provided by first data latches 440A for PDAF "left" data, plus 3 bits provided by second data latches 440B for PDAF "right" data. In other words, it is appreciated that the PDAF data storage latches 445 may be shared among multiple columns of the pixel array (e.g., pixel array 102).

FIG. 4B illustrates another example of timing of analog-to-digital conversion (ADC) operations and storage of various extracted signals in example arithmetic logic unit 418 of FIG. 4A in accordance with the teachings of the present disclosure. In particular, FIG. 4B shows a sequence of four ADC operations including a first ADC operation 449A, a second ADC operation 449B, a third ADC operation 449C, and a fourth ADC operation 449D. In the example, the second ADC operation 449B occurs after the first ADC operation 449A, the third ADC operation 449C occurs after the second ADC operation 449B, and the fourth ADC operation 449D occurs after the third ADC operation 449C.

In the example, an ADC operation of a left black signal (e.g., blkL) occurs during first ADC operation 449A. As such, after the first ADC operation 449A is complete and before the second ADC operation 449B begins, the Gray code representation q_gc<11:0> 422 of the left black signal (e.g., blkL) is latched in signal latch stage 428 and the binary representation of the black signal (e.g., blkL) is latched in first adder input latch 432A of adder input latch stage 432 through first inputs of the first feedback multiplexer 451A and in response to first adder input latch enable signal wen_1st 456A.

During the second ADC operation 449B, an ADC operation of a left signal (e.g., sigL) occurs. As such, after the second ADC operation 449B is complete and before the third ADC operation 449C begins, the Gray code representation q_gc<11:0> 422 of the left signal (e.g., sigL) is latched in signal latch stage 428 and the binary representation of the left signal (e.g., sigL) is coupled to be received at first inputs of the adder stage 436. In the example, the adder input multiplexer stage 434 is configured such that the left black signal (e.g., blkL) that is latched in the first adder input latch 432A is coupled to be received by the second inputs of the adder stage 436 through the first inputs of the adder input multiplexer stage 434. As such, with the left signal (e.g., sigL) at the first inputs of adder stage 436 and with the left black signal (e.g., blkL) at the second inputs of adder stage 436, a correlated double sampling (CDS) left signal (e.g., cdssigL) is coupled to be latched in the first data latches 440A of the data latch stage 440 through the outputs of the adder stage 436 in response to first data latch enable signal wwl_PDL 464A. In the example, the CDS left signal (e.g., cdssigL) is equal to the difference between the first and second inputs (e.g., sigL-blkL) of the adder stage 436. In addition, the CDS left signal (e.g., cdssigL) is also latched in second adder input latch 432B of adder input latch stage 432 through second inputs of second feedback multiplexer 451B and in response to second adder input latch enable signal wen_2nd 456B.

During the third ADC operation 449C, an ADC operation of a right black signal (e.g., blkR) occurs. As such, during ADC operation 449C, a right black signal is coupled to be latched in the signal latch stage 428 and received by the first inputs of the adder stage 436. In particular, the Gray code representation q_gc<11:0> 422 of the right black signal (e.g., blkR) is latched in signal latch stage 428 and the binary representation of the right black signal (e.g., blkR) is coupled received by the first inputs of the adder stage 436. In the example, the adder input multiplexer stage 434 is configured such that the CDS left signal (e.g., cdssigL) that is latched in the second adder input latch 432B is coupled to be received by the second inputs of the adder stage 436 through the second inputs of the adder input multiplexer stage 434. As such, with the right black signal (e.g., blkR) at the first inputs of adder stage 436 and with the CDS left signal (e.g., cdssigL) at the second inputs of adder stage 436, a difference between the right black signal and the CDS left signal (e.g., blkR-cdssigL) is coupled to be latched in the first data latches 440A of the data latch stage 440 through the outputs of the adder stage 436 and through the second inputs of the first feedback multiplexer 451A in response to second data latch enable signal wwl_PDR 464B.

Continuing with the third ADC operation 449C, after the difference between the right black signal and the CDS left signal (e.g., blkR-cdssigL) is latched in the first adder input latch 432A, the right black signal (e.g., blkR) is latched in the second adder input latch 432B through the first inputs of the second feedback multiplexer 451B.

During the fourth ADC operation 449D, an ADC operation of a right signal occurs. As such, during ADC operation 449D, a right signal (e.g., sigR) is coupled to be latched in the signal latch stage 428 and received by the first inputs of the adder stage 436. In particular, the Gray code representation q_gc<11:0> 422 of the right signal (e.g., sigR) is latched in signal latch stage 428 and the binary representation of the right signal (e.g., sigR) is coupled received by the first inputs of the adder stage 436. In the example, the adder input multiplexer stage 434 is configured such that the difference between the right black signal and the CDS left signal (e.g., blkR-cdssigL) that is latched in the first adder input latch 432A is coupled to be received by the second inputs of the adder stage 436 through the first inputs of the adder input multiplexer stage 434. As such, with the right signal (e.g., sigR) at the first inputs of adder stage 436 and with the difference between the right black signal and the CDS left signal (e.g., blkR-cdssigL) at the second inputs of adder stage 436, a difference between the right signal (e.g., sigR) and the difference between the right black signal and the CDS left signal (e.g., blkR-cdssigL), which is equal to sigR−(blkR−cdssigL), which is equal to a CDS left-right signal (e.g., cdssigL+cdssigR), is coupled to be latched in the third data latches 440C of the data latch stage 440 through the outputs of the adder stage 436.

Continuing with the fourth ADC operation 449D, after the CDS left-right signal (e.g., cdssigL+cdssigR) is latched in the third data latches 440C, the right black signal (e.g., blkR) that is latched in the second adder input latch 432B is coupled to be received at the second inputs of the adder stage 436 through the second inputs of the adder input multiplexer stage 434. As such, with the right signal (e.g., sigR) at the first inputs of adder stage 436 and with the right black signal (e.g., blkR) at the second inputs of adder stage 436, a difference between the right signal and the right black signal (e.g., sigR-blkR), which is equal to a CDS right signal (e.g., cdssigR), is coupled to be latched in the second data latches 440B of the data latch stage 440 through the outputs of the adder stage 436.

In the various examples, it is appreciated that the CDS left signal (e.g., cdssigL) latched in first data latches 440A, the CDS right signal (e.g., cdssigR) latched in second data latches 440B, and the CDS left-right signal (e.g., cdssigL+cdssigR) latched in third data latches 440C may be output from ALU 418 as output bits rbl<11:0> 447 through output switches rwl_pdl 443A, rwl_pdr 443B, and rwl_cdssig 443C, respectively, as shown.

Figures 5A, 5B:
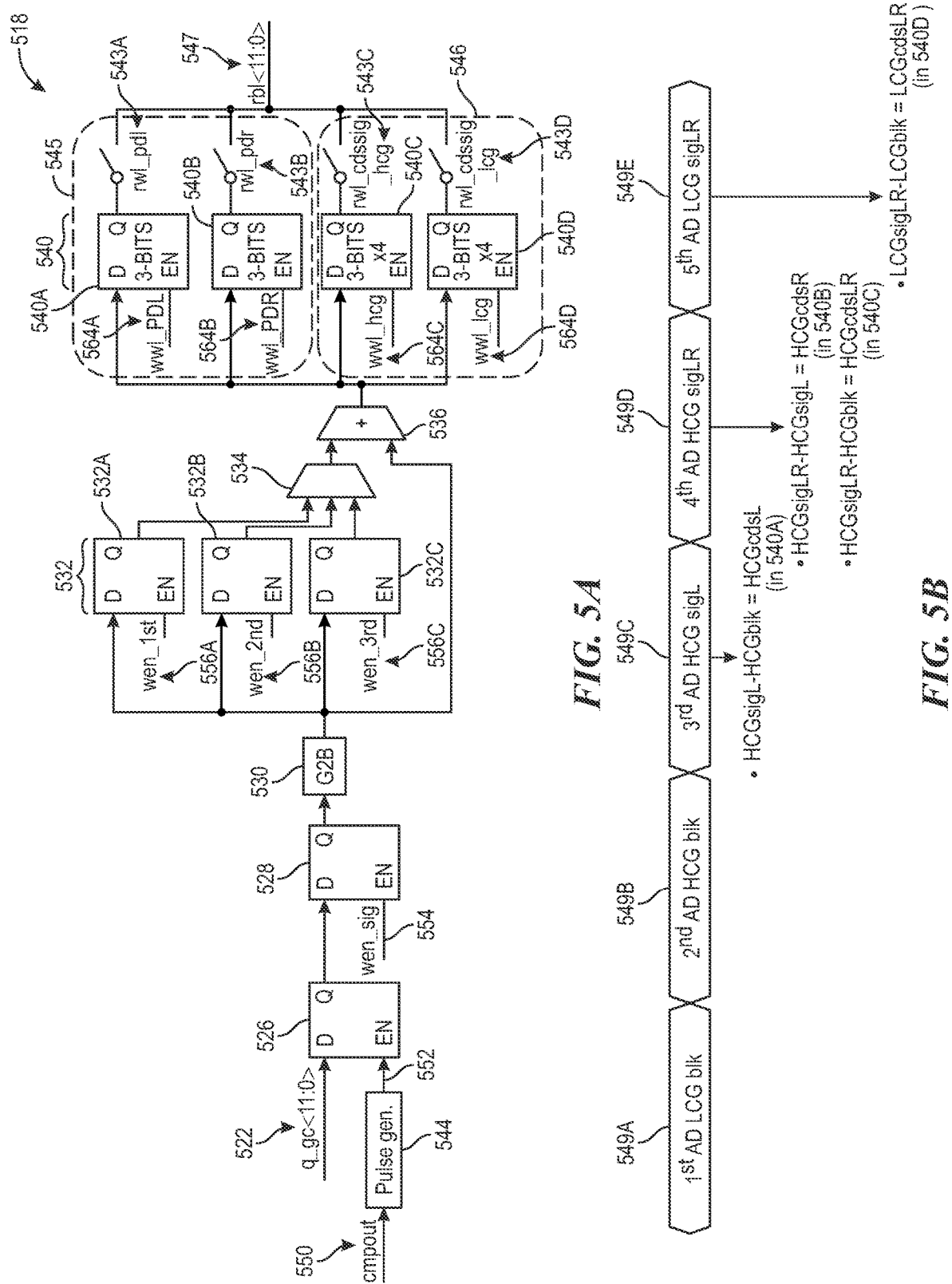
FIG. 5A is a schematic that illustrates yet another example of a portion of one of a plurality of arithmetic logic units in accordance with the teachings of the present disclosure.
FIG. 5B illustrates yet another example of timing of analog-to-digital conversions and storage of various extracted signals in yet another example arithmetic logic unit in accordance with the teachings of the present disclosure.

FIG. 5A is a schematic that illustrates yet another example of a portion of one of a plurality of ALUs 518 in accordance with the teachings of the present disclosure. It is appreciated the portion of ALU 518 depicted in FIG. 5A may be yet another example of one of the plurality of column ALUs 218 as shown in FIG. 2, and that similarly named and numbered elements described above are coupled and function similarly below. It is also appreciated that the portion of ALU 518 depicted in FIG. 5A shares many similarities with the portion of ALU 418 depicted in FIG. 4A and/or with ALU 318 depicted in FIG. 3A. For instance, in the various examples, it is noted that each one of the plurality of ALUs 518 is coupled to sample and hold or latch a corresponding bit of a received 12-bit Gray code q_gc<11:0> 522 in response to the arrival of a falling edge of comparator output cmpout 550 to complete the analog-to-digital conversion by converting the latched 12-bit Gray code q_gc<11:0> 422 to a binary value.

As shown in the depicted example, ALU 518 includes a front end latch stage 526 coupled to receive and latch a respective bit of Gray code q_gc<11:0> 522 signal in response to comparator output cmpout 550. In the illustrated example, each latch of front end latch stage 526 has a data input "D" coupled to receive the respective bit of Gray code q_gc<11:0>.

In the example, ALU 518 also includes a pulse generator 544 that is coupled to receive the comparator output cmpout 550 from the respective comparator (e.g., comparator 216) of the column. In one example, the pulse generator 544 is coupled to generate a front end latch enable signal 552 in response to the arrival of a falling edge in the comparator output cmpout 550. In one example, the pulse of front end latch enable signal 552 is coupled to an enable input of each latch of front end latch stage 526.

In the depicted example, ALU 518 also includes a signal latch stage 528 coupled to the output of the front end latch stage 526. In operation, the signal latch stage 528 is coupled to latch outputs of the front end latch stage 526 in response to a signal latch enable signal wen_sig 554. As shown in the depicted example, each latch of the signal latch stage 528 includes a data input "D" coupled to the "Q" output of a respective one of latches of the front end latch stage 526.

The example in FIG. 5A shows that ALU 518 also includes a GC to binary stage (e.g., G2B) 530 that is coupled to generate binary representations of the Gray code q_gc<0> 522 signal values latched in the front end latch stage 526. In one example, GC to binary stage 530 includes a plurality of exclusive-OR gates (not shown), each of which has an output coupled to generate the corresponding binary bit, and an input coupled to receive a respective "Q" output of the respective latch of signal latch stage 528.

As shown in the depicted example depicted in FIG. 5A, the ALU 518 also includes an adder stage 536, which includes a plurality of full adders, each of which having a first input coupled to an output of the GC to binary stage 530, and a second input coupled to an output of an adder input multiplexer stage 534, which will be described in greater detail below. In operation, the outputs of the adder stage 536 are generated in response to the first inputs from the GC to binary stage 530 and the second inputs from the adder input multiplexer stage 534. In one example, the outputs of adder stage 536 are configured to determine the difference between the values received at the first inputs and the values received at second inputs of the adder stage 536.

Continuing with the example depicted in FIG. 5A, the ALU 518 further includes an adder input latch stage 532 coupled to latch outputs of the GC to binary stage 530. One of the differences between ALU 518 of FIG. 5A and ALU 318 of FIG. 3A is that adder input latch stage 532 of FIG. 5A includes three adder input latches. For instance, as shown in the example depicted in FIG. 5A, the adder input latch stage 532 includes first adder input latches 522A, which are configured to latch the outputs of the GC to binary stage 330 in response to a first adder input latch enable signal wen_1st 556A, second adder input latches 532B, which are configured to latch the outputs of the GC to binary stage 530 in response to a second adder input latch enable signal wen_2nd 556B, and third adder input latches 532C, which are configured to latch the outputs of the GC to binary stage 530 in response to a third adder input latch enable signal wen_3rd 556C. In the depicted example, first inputs of the adder input multiplexer stage 534 are coupled to receive outputs of the first adder input latches 532A, second inputs of the adder input multiplexer stage 534 are coupled to receive outputs of the second adder input latches 532B, and third inputs of the adder input multiplexer stage 534 are coupled to receive outputs of the third adder input latches 532C. In operation, the second inputs of the adder stage 536 are coupled to receive outputs of one of the first adder input latches 532A, second adder input latches 532B, or third adder input latches 532B through the outputs of the adder input multiplexer stage 534.

The example in FIG. 5A shows that ALU 518 also includes a data latch stage 540 coupled to latch outputs of the adder stage 536. It is appreciated that data latch stage 540 of FIG. 5A also shares many similarities with data latch stage 450 of FIG. 4A and/or data latch stage 350 of FIG. 3A. For instance, as shown in the example depicted in FIG. 5A, the data latch stage 540 includes first data latches 540A, second data latches 540B, and third data latches 540C. One of the differences between data latch stage 540 of FIG. 5A and data latch stage 440 of FIG. 4A or data latch stage 340 of FIG. 3A is that data latch stage 540 of FIG. 5A further includes fourth data latches 540D.

In the example, the first data latches 540A are configured to latch high conversion gain (HCG) CDS left signals (e.g., HCGcdssigL) from the outputs of the adder stage 536 in response to a first data latch enable signal wwl_PDL 564A, the second data latches 540B are configured to latch HCG CDS right signals (e.g., HCGcdssigR) from the outputs of the adder stage 536 in response to a second data latch enable signal wwl_PDR 564B, the third data latches 540C are configured to latch HCG CDS left-right signals (e.g., HCGcdsLR) from the outputs of the adder stage 536 in response to a third data latch enable signal wwl_hcg 564C, and the fourth data latches 540D are configured to latch LCG CDS left-right signals (e.g., LCGcdsLR) from the outputs of the adder stage 536 in response to a fourth data latch enable signal wwl_lcg 564D.

In the various examples, it is appreciated that the data latch stage 540 includes a PDAF data storage latches 545, which are coupled to latch PDAF data, and image storage latches 546, which are coupled to latch image signal data. In the example, the PDAF data storage latches 545 include first data latches 540A and second data latches 540B, and image storage latches 546 include third data latches 540C and fourth data latches 540D.

In the depicted example, it is appreciated that there are more third data latches 540C and fourth data latches 540D in image storage latches 546 than there are first data latches 540A and second data latches 540B in PDAF data storage latches 545. For instance, in one example, the data latch stage 540 includes three first data latches 540A or three second data latches 540B for every twelve third data latches 540C or every twelve fourth data latches 540D. In another example, the data latch stage 540 includes three first data latches 540A and three second data latches 540B for every twelve third data latches 540C and every twelve fourth data latches 540D.

Similar to the examples depicted in FIGS. 3A and 4A, the example depicted in FIG. 5A shows that there are "3-bits" of first data latches 540A, "3-bits" of second data latches 540B, "3-bits×4" third data latches 540C, and "3-bits×4" fourth data latches 540D in data latches stage 540. In the example, the data itself is 12-bit and grouped into 4×3-bit, which depicts the distribution of storage. In an 8-column column example with a 4×8 region of pixels of a pixel array (e.g., pixel array 102), for 4 upper analog-to-digital converters plus 4 lower analog-to-digital converters, the storage provided by data latches 540 includes 4×3-bits by third data latches 540C or fourth data latches 540D, plus 1×3-bits provided by either first data latches 540A for HCG CDS left PDAF data or second data latches 540B for HCG CDS right PDAF data. Thus, it is appreciated that PDAF data storage latches 545 may be shared among multiple columns of the pixel array (e.g., pixel array 102).

FIG. 5B illustrates yet another example of timing of analog-to-digital conversions and storage of various extracted signals in the example arithmetic logic unit 518 of FIG. 5A in accordance with the teachings of the present disclosure. In particular, FIG. 5B shows a sequence of five ADC operations including a first ADC operation 549A, a second ADC operation 549B, a third ADC operation 549C, a fourth ADC operation 549D, and a fifth ADC operation 549E. In the example, the second ADC operation 549B occurs after the first ADC operation 549A, the third ADC operation 549C occurs after the second 5DC operation 449B, the fourth ADC operation 549D occurs after the third ADC operation 549C, and the fifth ADC operation 549E occurs after the fourth ADC operation 549D.

In the example, an ADC operation of a low conversion gain (LCG) black signal (e.g., LCGblk) occurs during first ADC operation 549A. As such, after the first ADC operation 549A is complete and before the second ADC operation 549B begins, the Gray code representation q_gc<11:0> 522 of the LCG black signal (e.g., LCGblk) is latched in signal latch stage 528 and the binary representation of the LCG black signal (e.g., LCGblk) is latched in first adder input latch 532A of adder input latch stage 532 in response to first adder input latch enable signal wen_1st 556A.

During the second ADC operation 549B, an ADC operation of a high conversion gain (HCG) black signal (e.g., HCGblk) occurs. As such, after the second ADC operation 549B is complete and before the third ADC operation 549C begins, the Gray code representation q_gc<11:0> 522 of the HCG black signal (e.g., HCGblk) is latched in signal latch stage 528 and the binary representation of the HCG black signal (e.g., HCGblk) is latched in second adder input latch 532B of adder input latch stage 532 in response to second adder input latch enable signal wen_2nd 556B.

During the third ADC operation 549C, an ADC operation of an HCG left signal (e.g., HCGsigL) occurs. As such, after the third ADC operation 549C is complete and before the fourth ADC operation 549D begins, the Gray code representation q_gc<11:0> 522 of the HCG left signal (e.g., HCGsigL) is latched in signal latch stage 528 and the binary representation of the HCG left signal (e.g., HCGsigL) is latched in third adder input latch 532C of adder input latch stage 532 in response to third adder input latch enable signal wen_3rd 556C and coupled to be received at first inputs of the adder stage 536. In the example, the adder input multiplexer stage 534 is configured such that the HCG black signal (e.g., HCGblk) that is latched in the second adder input latch 532B is coupled to be received by the second inputs of the adder stage 536 through the second inputs of the adder input multiplexer stage 534. As such, with the HCG left signal (e.g., HCGsigL) at the first inputs of adder stage 536 and with the HCG black signal (e.g., HCGblk) at the second inputs of adder stage 536, an HCG correlated double sampling (CDS) left signal (e.g., HCGcdsL) is coupled to be latched in the first data latches 540A of the data latch stage 540 through the outputs of the adder stage 536 in response to first data latch enable signal wwl_PDL 564A. In the example, the HCG CDS left signal (e.g., HCGcdsL) is equal to the difference between the first and second inputs (e.g., HCGsigL-HCGblk) of the adder stage 536.

During the fourth ADC operation 549D, an ADC operation of an HCG left-right signal (e.g., HCGsigLR) occurs. As such, during the fourth ADC operation 549D, an HCG left-right signal (e.g., HCGsigLR) is coupled to be latched in the signal latch stage 528 and received by the first inputs of the adder stage 536. In particular, the Gray code representation q_gc<11:0> 522 of the HCG left-right signal (e.g., HCGsigLR) is latched in signal latch stage 528 and the binary representation of the HCG left-right signal (e.g., HCGsigLR) is coupled to be received at first inputs of the adder stage 536. In the example, the adder input multiplexer stage 534 is configured such that the HCG left signal (e.g., HCGsigL) that is latched in third adder input latch 532C of adder input latch stage 532 is coupled to be received by the second inputs of the adder stage 536 through the third inputs of the adder input multiplexer stage 534. As such, with the HCG left-right signal (e.g., HCGsigLR) at the first inputs of adder stage 536 and with the HCG left signal (e.g., HCGsigL) at the second inputs of adder stage 536, an HCG correlated double sampling (CDS) right signal (e.g., HCGcdsR) is coupled to be latched in the second data latches 540B of the data latch stage 540 through the outputs of the adder stage 536 in response to second data latch enable signal wwl_PDR 564B. In the example, the HCG CDS right signal (e.g., HCGcdsR) is equal to the difference between the first and second inputs (e.g., HCGsigLR-HCGsigL) of the adder stage 536.

Continuing with the fourth ADC operation 549D, after the HCG CDS right signal (e.g., HCGcdsR) is latched in the second data latches 540B, the adder input multiplexer stage 534 is configured such that the HCG black signal (e.g., HCGblk) that is latched in the second adder input latch 532B is coupled to be received by the second inputs of the adder stage 536 through the second inputs of the adder input multiplexer stage 534. As such, with the HCG left-right signal (e.g., HCGsigLR) at the first inputs of adder stage 536 and with the HCG black signal (e.g., HCGblk) at the second inputs of adder stage 536, an HCG correlated double sampling (CDS) left-right signal (e.g., HCGcdsLR) is coupled to be latched in the third data latches 540C of the data latch stage 540 through the outputs of the adder stage 536 in response to third data latch enable signal wwl_hcg 564C. In the example, the HCG CDS left-right signal (e.g., HCGcdsLR) is equal to the difference between the first and second inputs (HCGsigLR-HCGblk) of the adder stage 536.

During the fifth ADC operation 549E, an ADC operation of a low conversion gain (LCG) left-right signal (e.g., LCGsigLR) occurs. As such, after the fifth ADC operation 549E is complete, the Gray code representation q_gc<11:0> 522 of the LCG left-right signal (e.g., LCGsigLR) is latched in signal latch stage 528 and the binary representation of the LCG left-right signal (e.g., LCGsigLR) is coupled to be received at first inputs of the adder stage 536. In the example, the adder input multiplexer stage 534 is configured such that the LCG black signal (e.g., LCGblk) that is latched in the first adder input latch 532A is coupled to be received by the second inputs of the adder stage 536 through the first inputs of the adder input multiplexer stage 534. As such, with the LCG left-right signal (e.g., LCGsigLR) at the first inputs of adder stage 536 and with the LCG black signal (e.g., LCGblk) at the second inputs of adder stage 536, an LCG correlated double sampling (CDS) left-right signal (e.g., LCGcdsLR) is coupled to be latched in the fourth data latches 540D of the data latch stage 540 through the outputs of the adder stage 536 in response to fourth data latch enable signal wwl_lcg 564D. In the example, the LCG CDS left-right signal (e.g., LCGcdsLR) is equal to the difference between the first and second inputs (e.g., LCGsigLR-LCGblk) of the adder stage 536.

In the various examples, it is appreciated that the HCG CDS left signal (e.g., HCGcdsL) latched in first data latches 540A, the HCG CDS right signal (e.g., HCGcdsR) latched in second data latches 540B, the HCG CDS left-right signal (e.g., HCGcdsLR) latched in third data latches 540C, the LCG CDS left-right signal (e.g., LCGcdsLR) latched in fourth data latches 540D may be output from ALU 518 as output bits rbl<11:0> 547 through output switches rwl_pdl 543A, rwl_pdr 543B, rwl_cdssig_hcg 543C, and rwl_cdssig_lcg 543D, respectively, as shown.

The above description of illustrated examples of the embodiments, including what is described in the Abstract, is not intended to be exhaustive or to limit the embodiments to the precise forms disclosed. While specific examples of the embodiments are described herein for illustrative purposes, various modifications are possible within the scope of the embodiments, as those skilled in the relevant art will recognize.

These modifications can be made to the embodiments in light of the above detailed description. The terms used in the following claims should not be construed to limit the embodiments to the specific examples disclosed in the specification. Rather, the scope of the embodiments is to be determined entirely by the following claims, which are to be construed in accordance with established doctrines of claim interpretation.

What is claimed is:

1. An arithmetic logic unit (ALU), comprising:
   a front end latch stage coupled to a Gray code (GC) generator to latch GC outputs of the GC generator in response to a comparator output;
   a signal latch stage coupled to latch outputs of the front end latch stage in response to a signal latch enable signal;
   a GC to binary stage coupled to generate a binary representation of the GC outputs latched in the signal latch stage;
   an adder stage including first inputs and second inputs, wherein the first inputs of the adder stage are coupled to receive outputs of the GC to binary stage, wherein outputs of the adder stage are generated in response to the first inputs and the second inputs of the adder stage;
   an adder input latch stage coupled to latch outputs of the GC to binary stage, wherein the adder input latch stage comprises:
     first adder input latches configured to latch the outputs of the GC to binary stage in response to a first adder input latch enable signal; and
     second adder input latches configured to latch the outputs of the GC to binary stage in response to a second adder input latch enable signal; and
   an adder input multiplexer stage, wherein first inputs of the adder input multiplexer stage are coupled to receive outputs of the first adder input latches, wherein second inputs of the adder input multiplexer stage are coupled to receive outputs of the second adder input latches, wherein the second inputs of the adder stage are coupled to receive outputs of the adder input multiplexer stage.

2. The ALU of claim 1, further comprising a pulse generator coupled to the comparator output to generate a front end latch enable signal in response to an analog-to-digital (ADC) operation on a signal from a pixel array, wherein the front end latch stage is coupled to latch the GC outputs of the GC generator in response to the front end latch enable signal.

3. The ALU of claim 2, further comprising a data latch stage coupled to latch outputs of the adder stage, wherein the data latch stage comprises:
   first data latches configured to latch first phase detection signals from the outputs of the adder stage in response to a first data latch enable signal;
   second data latches configured to latch second phase detection signals from the outputs of the adder stage in response to a second data latch enable signal; and
   third data latches configured to latch first summed data signals from the outputs of the adder stage in response to a third data latch enable signal.

4. The ALU of claim 3, wherein the data latch stage comprises three first data latches and three second data latches for every twelve third data latches.

5. The ALU of claim 3, wherein the data latch stage further comprises fourth data latches configured to latch second summed data signals from the outputs of the adder stage in response to a fourth data latch enable signal.

6. The ALU of claim 5, wherein the data latch stage comprises three first data latches or three second data latches for every twelve third data latches or every twelve fourth data latches.

7. The ALU of claim 5, wherein the data latch stage comprises three first data latches and three second data latches for every twelve third data latches and every twelve fourth data latches.

8. The ALU of claim 5, wherein the adder input latch stage further comprises third adder input latches configured to latch the outputs of the GC to binary stage in response to a third adder input latch enable signal, wherein third inputs of the adder input multiplexer stage are coupled to receive outputs of the third adder input latches.

9. The ALU of claim 8, wherein the ADC operation is one of a sequence of ADC operations including a first ADC operation, wherein after the first ADC operation, a low conversion gain (LCG) black signal is coupled to be latched in the signal latch stage and latched in the first adder input latches of the adder input latch stage.

10. The ALU of claim 9, wherein the sequence of ADC operations further includes a second ADC operation that occurs after the first ADC operation, wherein after the second ADC operation, a high conversion gain (HCG) black signal is coupled to be latched in the signal latch stage and latched in the second adder input latches of the adder input latch stage.

11. The ALU of claim 10, wherein the sequence of ADC operations further includes a third ADC operation that occurs after the second ADC operation, wherein after the third ADC operation:
an HCG left signal is coupled to be latched in the signal latch stage, latched in the third adder input latches of the adder input latch stage, and received by the first inputs of the adder stage,
the HCG black signal is coupled to be received by the second inputs of the adder stage through the second inputs of the adder input multiplexer stage, and
an HCG CDS left signal is coupled to be latched in the first data latches of the data latch stage through the outputs of the adder stage.

12. The ALU of claim 11, wherein the sequence of ADC operations further includes a fourth ADC operation that occurs after the third ADC operation, wherein after the fourth ADC operation:
an HCG left-right signal is coupled to be latched in the signal latch stage and received by the first inputs of the adder stage,
the HCG left signal is coupled to be received by the second inputs of the adder stage through the third inputs of the adder input multiplexer stage, and
an HCG CDS right signal is coupled to be latched in the second data latches of the data latch stage through the outputs of the adder stage.

13. The ALU of claim 12, wherein after the HCG CDS right signal is latched in the second data latches of the data latch stage:
the HCG black signal is coupled to be received by the second inputs of the adder stage through the second inputs of the adder input multiplexer stage, and
an HCG CDS left-right signal is coupled to be latched in the third data latches of the data latch stage through the outputs of the adder stage.

14. The ALU of claim 13, wherein after the HCG CDS left-right signal is latched in the third data latches of the data latch stage:
an LCG left-right signal is coupled to be latched in the signal latch stage and received by the first inputs of the adder stage,
the LCG black signal is coupled to be received by the second inputs of the adder stage through the first inputs of the adder input multiplexer stage, and
an LCG CDS left-right signal is coupled to be latched in the fourth data latches of the data latch stage through the outputs of the adder stage.

15. The ALU of claim 3, wherein the ADC operation is one of a sequence of ADC operations including a first ADC operation, wherein after the first ADC operation, a black signal is coupled to be latched in the signal latch stage and latched in the first adder input latches of the adder input latch stage.

16. The ALU of claim 15, wherein the sequence of ADC operations further includes a second ADC operation that occurs after the first ADC operation, wherein after the second ADC operation:
a left signal is coupled to be latched in the signal latch stage, latched in the second adder input latches of the adder input latch stage, and received by the first inputs of the adder stage,
the black signal is coupled to be received by the second inputs of the adder stage through the first inputs of the adder input multiplexer stage, and
a correlated double sampling (CDS) left signal is coupled to be latched in the first data latches of the data latch stage through the outputs of the adder stage.

17. The ALU of claim 16, wherein the sequence of ADC operations further includes a third ADC operation that occurs after the second ADC operation, wherein after the third ADC operation:
a left-right signal is coupled to be latched in the signal latch stage and received by the first inputs of the adder stage,
the left signal is coupled to be received by the second inputs of the adder stage through the second inputs of the adder input multiplexer stage, and
a CDS right signal is coupled to be latched in the second data latches of the data latch stage through the outputs of the adder stage.

18. The ALU of claim 17, wherein after the CDS right signal is latched in the second data latches of the data latch stage:
the left-right signal is coupled to be received by the first inputs of the adder stage,
the black signal is coupled to be received by the second inputs of the adder stage through the first inputs of the adder input multiplexer stage, and
a CDS left-right signal is coupled to be latched in the third data latches of the data latch stage through the outputs of the adder stage.

19. The ALU of claim 3, wherein the ALU further comprises a feedback multiplexer stage, wherein the feedback multiplexer stage comprises:
first feedback multiplexers having first inputs coupled the outputs of the GC to binary stage and second inputs coupled to the outputs of the adder stage, wherein the first adder input latches are further configured to latch the outputs of the GC to binary stage or the outputs of the adder stage; and
second feedback multiplexers having first inputs coupled the outputs of the GC to binary stage and second inputs coupled to the outputs of the adder stage, wherein the second adder input latches are further configured to latch the outputs of the GC to binary stage or the outputs of the adder stage.

20. The ALU of claim 19, wherein the ADC operation is one of a sequence of ADC operations including a first ADC operation, wherein after the first ADC operation, a left black signal is coupled to be latched in the signal latch stage and latched in the first adder input latches of the adder input latch stage through the first inputs of the first feedback multiplexers of the feedback multiplexer stage.

21. The ALU of claim 20, wherein the sequence of ADC operations further includes a second ADC operation that occurs after the first ADC operation, wherein after the second ADC operation:
 a left signal is coupled to be latched in the signal latch stage and received by the first inputs of the adder stage,
 the black signal is coupled to be received by the second inputs of the adder stage through the first inputs of the adder input multiplexer stage, and
 a correlated double sampling (CDS) left signal is coupled to be latched in the first data latches of the data latch stage through the outputs of the adder stage and latched in the second adder input latches of the adder input latch stage through the second inputs of the second feedback multiplexers of the feedback multiplexer stage.

22. The ALU of claim 21, wherein the sequence of ADC operations further includes a third ADC operation that occurs after the second ADC operation, wherein after the third ADC operation:
 a right black signal is coupled to be latched in the signal latch stage and received by the first inputs of the adder stage,
 the CDS left signal is coupled to be received by the second inputs of the adder stage through the second inputs of the adder input multiplexer stage, and
 a right black-CDS left difference signal is coupled to be latched in the first adder input latches of the adder input latch stage through the second inputs of the first feedback multiplexer of the feedback multiplexer stage and through the outputs of the adder stage.

23. The ALU of claim 22, wherein after the right black-CDS left difference signal is coupled to be latched in the first adder input latches of the adder input latch stage, the right black signal is coupled to be latched in the second adder input latches of the adder input latch stage through the first inputs of the second feedback multiplexer of the feedback multiplexer stage.

24. The ALU of claim 23, wherein the sequence of ADC operations further includes a fourth ADC operation that occurs after the right black signal is coupled to be latched in the second adder input latches of the adder input latch stage, wherein after the fourth ADC operation:
 a right signal is coupled to be latched in the signal latch stage and received by the first inputs of the adder stage,
 the right black-CDS left difference signal is coupled to be received by the second inputs of the adder stage through the first inputs of the adder input multiplexer stage, and
 a CDS left-right signal is coupled to be coupled to be latched in the third data latches of the data latch stage through the outputs of the adder stage.

25. The ALU of claim 24, wherein after the CDS left-right signal is latched in the third data latches of the data latch stage:
 the right black signal is coupled to be received by the second inputs of the adder stage through the second inputs of the adder input multiplexer stage, and
 a CDS right signal is coupled to be latched in the second data latches of the data latch stage through the outputs of the adder stage.

26. An imaging system, comprising:
 a pixel array including a plurality of pixel circuits arranged into rows and columns, wherein each one of the plurality of pixel circuits is coupled to generate an analog image data signal in response to incident light;
 control circuitry coupled to the pixel array to control operation of the pixel array; and
 a readout circuit coupled to the pixel array through a plurality of column bit lines, wherein the readout circuit comprises:
  a plurality of comparators, wherein each one of the plurality of comparators is coupled to receive a ramp signal, wherein each one of the plurality of comparators is further coupled to a respective one of a plurality of column bit lines to receive a respective analog image data signal, wherein each one of the plurality of comparators is coupled to generate a respective comparator output in response to a comparison of the respective analog image data signal and the ramp signal;
  a Gray code (GC) generator coupled to generate GC outputs; and
  a plurality of arithmetic logic units (ALUs), wherein each one of the plurality of ALUs is coupled to receive the GC outputs, wherein each one of the plurality of ALUs is further coupled to a respective one of the plurality of comparators to receive the respective comparator output, wherein each one of the plurality of ALUs comprises:
   a front end latch stage coupled to the GC generator to latch GC outputs of the GC generator in response to the respective comparator output;
   a signal latch stage coupled to latch outputs of the front end latch stage in response to a signal latch enable signal;
   a GC to binary stage coupled to generate a binary representation of the GC outputs latched in the signal latch stage;
   an adder stage including first inputs and second inputs, wherein the first inputs of the adder stage are coupled to receive outputs of the GC to binary stage, wherein outputs of the adder stage are generated in response to the first inputs and the second inputs of the adder stage;
   an adder input latch stage coupled to latch outputs of the GC to binary stage, wherein the adder input latch stage comprises:
    first adder input latches configured to latch the outputs of the GC to binary stage in response to a first adder input latch enable signal; and
    second adder input latches configured to latch the outputs of the GC to binary stage in response to a second adder input latch enable signal; and
   an adder input multiplexer stage, wherein first inputs of the adder input multiplexer stage are coupled to receive outputs of the first adder input latches, wherein second inputs of the adder input multiplexer stage are coupled to receive outputs of the second adder input latches, wherein the second inputs of the adder stage are coupled to receive outputs of the adder input multiplexer stage.

27. The imaging system of claim 26, further comprising function logic coupled to the readout circuit to store the image data read out from the pixel array.

28. The imaging system of claim 26, wherein each one of the plurality of ALUs comprises a pulse generator coupled to the respective comparator output to generate a front end latch enable signal in response to an analog-to-digital (ADC) operation on a signal from the pixel array, wherein the front end latch stage is coupled to latch the GC outputs of the GC generator in response to the front end latch enable signal.

29. The imaging system of claim 28, wherein each one of the plurality of ALUs comprises a data latch stage coupled to latch outputs of the adder stage, wherein the data latch stage comprises:
first data latches configured to latch first phase detection signals from the outputs of the adder stage in response to a first data latch enable signal;
second data latches configured to latch second phase detection signals from the outputs of the adder stage in response to a second data latch enable signal; and
third data latches configured to latch first summed data signals from the outputs of the adder stage in response to a third data latch enable signal.

30. The imaging system of claim 29, wherein the data latch stage comprises three first data latches and three second data latches for every twelve third data latches.

31. The imaging system of claim 29, wherein the data latch stage further comprises fourth data latches configured to latch second summed data signals from the outputs of the adder stage in response to a fourth data latch enable signal.

32. The imaging system of claim 31, wherein the data latch stage comprises three first data latches or three second data latches for every twelve third data latches or every twelve fourth data latches.

33. The imaging system of claim 31, wherein the data latch stage comprises three first data latches and three second data latches for every twelve third data latches and every twelve fourth data latches.

34. The imaging system of claim 31, wherein the adder input latch stage further comprises third adder input latches configured to latch the outputs of the GC to binary stage in response to a third adder input latch enable signal, wherein third inputs of the adder input multiplexer stage are coupled to receive outputs of the third adder input latches.

35. The imaging system of claim 34, wherein the ADC operation is one of a sequence of ADC operations including a first ADC operation, wherein after the first ADC operation, a low conversion gain (LCG) black signal is coupled to be latched in the signal latch stage and latched in the first adder input latches of the adder input latch stage.

36. The imaging system of claim 35, wherein the sequence of ADC operations further includes a second ADC operation that occurs after the first ADC operation, wherein after the second ADC operation, a high conversion gain (HCG) black signal is coupled to be latched in the signal latch stage and latched in the second adder input latches of the adder input latch stage.

37. The imaging system of claim 36, wherein the sequence of ADC operations further includes a third ADC operation that occurs after the second ADC operation, wherein after the third ADC operation:
an HCG left signal is coupled to be latched in the signal latch stage, latched in the third adder input latches of the adder input latch stage, and received by the first inputs of the adder stage,
the HCG black signal is coupled to be received by the second inputs of the adder stage through the second inputs of the adder input multiplexer stage, and
an HCG CDS left signal is coupled to be latched in the first data latches of the data latch stage through the outputs of the adder stage.

38. The imaging system of claim 37, wherein the sequence of ADC operations further includes a fourth ADC operation that occurs after the third ADC operation, wherein after the fourth ADC operation:
an HCG left-right signal is coupled to be latched in the signal latch stage and received by the first inputs of the adder stage,
the HCG left signal is coupled to be received by the second inputs of the adder stage through the third inputs of the adder input multiplexer stage, and
an HCG CDS right signal is coupled to be latched in the second data latches of the data latch stage through the outputs of the adder stage.

39. The imaging system of claim 38, wherein after the HCG CDS right signal is latched in the second data latches of the data latch stage:
the HCG black signal is coupled to be received by the second inputs of the adder stage through the second inputs of the adder input multiplexer stage, and
an HCG CDS left-right signal is coupled to be latched in the third data latches of the data latch stage through the outputs of the adder stage.

40. The imaging system of claim 39, wherein after the HCG CDS left-right signal is latched in the third data latches of the data latch stage:
an LCG left-right signal is coupled to be latched in the signal latch stage and received by the first inputs of the adder stage,
the LCG black signal is coupled to be received by the second inputs of the adder stage through the first inputs of the adder input multiplexer stage, and
an LCG CDS left-right signal is coupled to be latched in the fourth data latches of the data latch stage through the outputs of the adder stage.

41. The imaging system of claim 29, wherein the ADC operation is one of a sequence of ADC operations including a first ADC operation, wherein after the first ADC operation, a black signal is coupled to be latched in the signal latch stage and latched in the first adder input latches of the adder input latch stage.

42. The imaging system of claim 41, wherein the sequence of ADC operations further includes a second ADC operation that occurs after the first ADC operation, wherein after the second ADC operation:
a left signal is coupled to be latched in the signal latch stage, latched in the second adder input latches of the adder input latch stage, and received by the first inputs of the adder stage,
the black signal is coupled to be received by the second inputs of the adder stage through the first inputs of the adder input multiplexer stage, and
a correlated double sampling (CDS) left signal is coupled to be latched in the first data latches of the data latch stage through the outputs of the adder stage.

43. The imaging system of claim 42, wherein the sequence of ADC operations further includes a third ADC operation that occurs after the second ADC operation, wherein after the third ADC operation:
a left-right signal is coupled to be latched in the signal latch stage and received by the first inputs of the adder stage,
the left signal is coupled to be received by the second inputs of the adder stage through the second inputs of the adder input multiplexer stage, and
a CDS right signal is coupled to be latched in the second data latches of the data latch stage through the outputs of the adder stage.

44. The imaging system of claim 43, wherein after the CDS right signal is latched in the second data latches of the data latch stage:
- the left-right signal is coupled to be received by the first inputs of the adder stage,
- the black signal is coupled to be received by the second inputs of the adder stage through the first inputs of the adder input multiplexer stage, and
- a CDS left-right signal is coupled to be latched in the third data latches of the data latch stage through the outputs of the adder stage.

45. The imaging system of claim 29, wherein each one of the plurality of ALUs further comprises a feedback multiplexer stage, wherein the feedback multiplexer stage comprises:
- first feedback multiplexers having first inputs coupled the outputs of the GC to binary stage and second inputs coupled to the outputs of the adder stage, wherein the first adder input latches are further configured to latch the outputs of the GC to binary stage or the outputs of the adder stage; and
- second feedback multiplexers having first inputs coupled the outputs of the GC to binary stage and second inputs coupled to the outputs of the adder stage, wherein the second adder input latches are further configured to latch the outputs of the GC to binary stage or the outputs of the adder stage.

46. The imaging system of claim 45, wherein the ADC operation is one of a sequence of ADC operations including a first ADC operation, wherein after the first ADC operation, a left black signal is coupled to be latched in the signal latch stage and latched in the first adder input latches of the adder input latch stage through the first inputs of the first feedback multiplexers of the feedback multiplexer stage.

47. The imaging system of claim 46, wherein the sequence of ADC operations further includes a second ADC operation that occurs after the first ADC operation, wherein after the second ADC operation:
- a left signal is coupled to be latched in the signal latch stage and received by the first inputs of the adder stage,
- the black signal is coupled to be received by the second inputs of the adder stage through the first inputs of the adder input multiplexer stage, and
- a correlated double sampling (CDS) left signal is coupled to be latched in the first data latches of the data latch stage through the outputs of the adder stage and latched in the second adder input latches of the adder input latch stage through the second inputs of the second feedback multiplexers of the feedback multiplexer stage.

48. The imaging system of claim 47, wherein the sequence of ADC operations further includes a third ADC operation that occurs after the second ADC operation, wherein after the third ADC operation:
- a right black signal is coupled to be latched in the signal latch stage and received by the first inputs of the adder stage,
- the CDS left signal is coupled to be received by the second inputs of the adder stage through the second inputs of the adder input multiplexer stage, and
- a right black-CDS left difference signal is coupled to be latched in the first adder input latches of the adder input latch stage through the second inputs of the first feedback multiplexer of the feedback multiplexer stage and through the outputs of the adder stage.

49. The imaging system of claim 48, wherein after the right black-CDS left difference signal is coupled to be latched in the first adder input latches of the adder input latch stage, the right black signal is coupled to be latched in the second adder input latches of the adder input latch stage through the first inputs of the second feedback multiplexer of the feedback multiplexer stage.

50. The imaging system of claim 49, wherein the sequence of ADC operations further includes a fourth ADC operation that occurs after the right black signal is coupled to be latched in the second adder input latches of the adder input latch stage, wherein after the fourth ADC operation:
- a right signal is coupled to be latched in the signal latch stage and received by the first inputs of the adder stage,
- the right black-CDS left difference signal is coupled to be received by the second inputs of the adder stage through the first inputs of the adder input multiplexer stage, and
- a CDS left-right signal is coupled to be coupled to be latched in the third data latches of the data latch stage through the outputs of the adder stage.

51. The imaging system of claim 50, wherein after the CDS left-right signal is latched in the third data latches of the data latch stage:
- the right black signal is coupled to be received by the second inputs of the adder stage through the second inputs of the adder input multiplexer stage, and
- a CDS right signal is coupled to be latched in the second data latches of the data latch stage through the outputs of the adder stage.

* * * * *